(12) United States Patent
Mikesell et al.

(10) Patent No.: US 12,219,948 B1
(45) Date of Patent: *Feb. 11, 2025

(54) AUTONOMOUS LASER WEED ERADICATION

(71) Applicant: Carbon Autonomous Robotic Systems Inc., Seattle, WA (US)

(72) Inventors: Paul Mikesell, Bellevue, WA (US); Jonathan Mey, Bellingham, WA (US); Cory Gabrielsen, Seattle, WA (US)

(73) Assignee: Carbon Autonomous Robotic Systems Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/915,038

(22) Filed: Oct. 14, 2024

Related U.S. Application Data

(63) Continuation of application No. 18/893,097, filed on Sep. 23, 2024, which is a continuation of application
(Continued)

(51) Int. Cl.
*A01M 21/02* (2006.01)
*A01M 21/04* (2006.01)
(Continued)

(52) U.S. Cl.
CPC ............. *A01M 21/04* (2013.01); *G01P 15/08* (2013.01); *G02B 26/0816* (2013.01);
(Continued)

(58) Field of Classification Search
CPC ... G01P 15/08; G02B 26/0816; G02B 26/101; G06T 1/0014; G06T 7/70;
(Continued)

(56) References Cited

U.S. PATENT DOCUMENTS 2,848,119 A 8/1958 Fitser
3,302,052 A 1/1967 Schwab
(Continued)

FOREIGN PATENT DOCUMENTS

CA 2705830 A1 * 5/2009 ............. G01N 15/06
CN 105045950 A 11/2015
(Continued)

OTHER PUBLICATIONS

Naio Technologies.: OZ Brochure. 8 pages (accessed on Jul. 30, 2019).
(Continued)

*Primary Examiner* — Philip P. Dang
(74) *Attorney, Agent, or Firm* — Fortem IP LLP

(57) ABSTRACT

Disclosed herein are methods, devices, modules, and systems which may be employed for automated weed identification, control, and eradication. These methods, devices, modules, and systems provide an alternative to hand cultivation or chemical herbicides. Devices disclosed herein may be configured to locate, identify, and autonomously target a weed with a beam, such as a laser beam, which may burn or irradiate the weed. The methods, devices, modules, and systems may be used for agricultural crop management or for at-home weed control.

30 Claims, 11 Drawing Sheets

Related U.S. Application Data

No. 18/382,294, filed on Oct. 20, 2023, now Pat. No. 12,127,547, which is a continuation of application No. 18/106,026, filed on Feb. 6, 2023, now Pat. No. 12,108,752, which is a continuation of application No. 17/022,483, filed on Sep. 16, 2020, now Pat. No. 11,602,143.

(60) Provisional application No. 62/901,641, filed on Sep. 17, 2019.

(51) Int. Cl.
  *G01P 15/08* (2006.01)
  *G02B 26/08* (2006.01)
  *G06T 1/00* (2006.01)
  *G06T 7/70* (2017.01)

(52) U.S. Cl.
  CPC .............. *G06T 1/0014* (2013.01); *G06T 7/70* (2017.01); *G06T 2207/30188* (2013.01); *G06T 2207/30252* (2013.01)

(58) Field of Classification Search
  CPC ........... G06T 2207/30188; G06T 2207/30252; A01M 21/04
  See application file for complete search history.

(56) References Cited

U.S. PATENT DOCUMENTS

| | | | |
|---|---|---|---|
| 3,618,609 A | 11/1971 | Glick et al. | |
| 3,675,621 A | 7/1972 | Griffin et al. | |
| 3,741,214 A | 6/1973 | Tillander | |
| 3,778,155 A * | 12/1973 | Leavitt | G03B 27/08 355/87 |
| 6,199,000 B1 * | 3/2001 | Keller | A01B 79/005 342/357.62 |
| 6,477,403 B1 * | 11/2002 | Eguchi | A61B 1/00172 600/478 |
| 6,553,299 B1 * | 4/2003 | Keller | A01B 79/005 56/10.2 D |
| 6,795,568 B1 | 9/2004 | Christensen et al. | |
| 7,526,100 B1 | 4/2009 | Hartman et al. | |
| 7,859,519 B2 * | 12/2010 | Tulbert | G06F 3/0425 345/173 |
| 7,919,723 B2 * | 4/2011 | Ide | A01D 34/015 219/121.67 |
| 7,993,585 B2 * | 8/2011 | Black | G01N 1/2273 422/62 |
| 8,216,214 B2 * | 7/2012 | Weir | A61B 1/00172 606/2 |
| 8,665,436 B2 * | 3/2014 | Pagnoux | G01N 21/21 356/367 |
| 8,746,914 B2 * | 6/2014 | Nelson | G02B 7/002 362/230 |
| 9,000,340 B2 * | 4/2015 | Dicander | F41G 7/303 244/3.13 |
| 9,207,309 B2 * | 12/2015 | Bridges | G01C 15/002 |
| 9,289,122 B2 * | 3/2016 | Chinnock | A61B 3/14 |
| 9,456,067 B2 * | 9/2016 | Rudow | G01S 19/43 |
| 9,462,446 B2 * | 10/2016 | Rudow | H04W 4/023 |
| 9,467,814 B2 * | 10/2016 | Rudow | G01C 21/1654 |
| 9,476,695 B2 * | 10/2016 | Becker | G01C 15/002 |
| 9,565,848 B2 | 2/2017 | Stowe et al. | |
| 9,609,859 B2 | 4/2017 | Stowe et al. | |
| 9,639,941 B2 * | 5/2017 | Rudow | G01S 19/43 |
| 9,654,222 B1 * | 5/2017 | Shatz | G06T 19/006 |
| 9,709,987 B2 * | 7/2017 | Hyde | G05D 1/0219 |
| 9,955,551 B2 * | 4/2018 | Spero | F21S 41/143 |
| 9,992,396 B1 * | 6/2018 | Scepanovic | G03B 15/05 |
| 10,006,872 B2 * | 6/2018 | Seo | G01N 21/94 |
| 10,010,067 B2 | 7/2018 | Kent et al. | |
| 10,051,854 B2 | 8/2018 | Stowe et al. | |
| 10,126,415 B2 * | 11/2018 | Becker | G01S 7/4863 |
| 10,241,207 B2 * | 3/2019 | Rosenzweig | G01S 17/931 |
| 10,371,935 B1 * | 8/2019 | Patel | G02B 26/0875 |
| 10,489,621 B2 * | 11/2019 | Moriyama | G06K 7/10722 |
| 10,502,555 B2 * | 12/2019 | Nakamura | B23K 26/0884 |
| 10,624,275 B1 * | 4/2020 | Lewis | A01G 9/247 |
| 10,684,370 B2 * | 6/2020 | DeMersseman | H04N 23/55 |
| 10,750,736 B2 | 8/2020 | Kent et al. | |
| 10,776,639 B2 * | 9/2020 | Steinberg | G01S 7/026 |
| 10,905,397 B2 * | 2/2021 | Yang | A61B 5/0095 |
| 11,048,940 B2 | 6/2021 | Kiepe et al. | |
| 11,076,589 B1 | 8/2021 | Sibley et al. | |
| 11,093,745 B2 | 8/2021 | Redden et al. | |
| 11,129,343 B2 | 9/2021 | Redden et al. | |
| 11,153,499 B2 * | 10/2021 | Behrooz | G06T 5/50 |
| 11,255,663 B2 * | 2/2022 | Binder | G01B 15/00 |
| 11,373,288 B2 | 6/2022 | Peters | |
| 11,375,707 B1 | 7/2022 | Guice et al. | |
| 11,399,531 B1 | 8/2022 | Sibley et al. | |
| 11,425,852 B2 | 8/2022 | Sibley et al. | |
| 11,432,470 B2 | 9/2022 | Kurihara et al. | |
| 11,517,008 B1 | 12/2022 | Sibley et al. | |
| 11,526,997 B2 | 12/2022 | Sibley et al. | |
| 11,553,634 B2 | 1/2023 | Grant et al. | |
| 11,553,636 B1 | 1/2023 | Palomares et al. | |
| 11,589,570 B2 * | 2/2023 | Schlemmer | A01M 21/02 |
| 11,602,143 B2 | 3/2023 | Mikesell et al. | |
| 11,694,434 B2 | 7/2023 | Sibley et al. | |
| 11,748,976 B2 | 9/2023 | Redden et al. | |
| 11,751,559 B2 | 9/2023 | Sibley et al. | |
| 11,785,873 B2 | 10/2023 | Sibley et al. | |
| 11,937,524 B2 | 3/2024 | Sibley et al. | |
| 12,056,845 B2 | 8/2024 | Peake et al. | |
| 12,108,752 B2 | 10/2024 | Mikesell et al. | |
| 12,127,547 B2 | 10/2024 | Mikesell et al. | |
| 2013/0194548 A1 * | 8/2013 | Francis | A61B 3/15 351/208 |
| 2014/0311014 A1 * | 10/2014 | Feugier | A01M 1/026 43/107 |
| 2015/0070712 A1 * | 3/2015 | Cramer | G01S 17/42 356/620 |
| 2015/0071490 A1 | 3/2015 | Fukata et al. | |
| 2015/0075067 A1 | 3/2015 | Stowe et al. | |
| 2015/0075068 A1 | 3/2015 | Stowe et al. | |
| 2015/0245554 A1 | 9/2015 | Redden | |
| 2016/0117560 A1 | 4/2016 | Levi et al. | |
| 2016/0181764 A1 * | 6/2016 | Kanskar | H01S 5/02251 372/44.01 |
| 2016/0286779 A1 * | 10/2016 | Guice | A01M 1/226 |
| 2017/0146654 A1 | 5/2017 | Halloran et al. | |
| 2017/0188564 A1 | 7/2017 | Stowe et al. | |
| 2018/0136319 A1 * | 5/2018 | Send | G01S 7/4816 |
| 2018/0285482 A1 | 10/2018 | Santos et al. | |
| 2019/0097722 A1 * | 3/2019 | McLaurin | H01S 5/34333 |
| 2019/0154439 A1 | 5/2019 | Binder | |
| 2019/0159442 A1 | 5/2019 | Benjegerdes | |
| 2019/0200519 A1 | 7/2019 | Chrysanthakopoulos et al. | |
| 2019/0274296 A1 | 9/2019 | Schmidt | |
| 2019/0285893 A1 * | 9/2019 | Wang | G02B 27/01 |
| 2019/0353784 A1 * | 11/2019 | Toledano | G05D 1/2435 |
| 2020/0116643 A1 * | 4/2020 | Kun | H01S 3/0085 |
| 2020/0120886 A1 | 4/2020 | Geltner | |
| 2020/0150446 A1 * | 5/2020 | Thibon | G02B 27/46 |
| 2020/0205394 A1 | 7/2020 | Day et al. | |
| 2021/0076662 A1 | 3/2021 | Mikesell et al. | |
| 2021/0230904 A1 * | 7/2021 | Pizzato | F16P 3/08 |
| 2022/0254155 A1 | 8/2022 | Janssen et al. | |
| 2022/0361475 A1 | 11/2022 | Bachman et al. | |
| 2023/0044040 A1 | 2/2023 | Xu et al. | |
| 2023/0121291 A1 | 4/2023 | Sibley et al. | |
| 2023/0122084 A1 | 4/2023 | Sibley et al. | |
| 2023/0137419 A1 | 5/2023 | Sergeev et al. | |
| 2023/0232811 A1 | 7/2023 | Einat | |
| 2023/0237697 A1 | 7/2023 | Pillmann et al. | |
| 2023/0247928 A1 | 8/2023 | Sibley et al. | |
| 2023/0252624 A1 | 8/2023 | Sergeev et al. | |
| 2023/0252789 A1 | 8/2023 | Sibley et al. | |
| 2023/0252791 A1 | 8/2023 | Webb et al. | |
| 2023/0270036 A1 | 8/2023 | Groffils et al. | |
| 2023/0292736 A1 | 9/2023 | Mikesell et al. | |

(56) References Cited

U.S. PATENT DOCUMENTS

| | | |
|---|---|---|
| 2023/0292737 A1 | 9/2023 | Thompson et al. |
| 2023/0309444 A1 | 10/2023 | Cordeiro et al. |
| 2023/0333011 A1 | 10/2023 | Dev et al. |
| 2023/0343090 A1 | 10/2023 | Khait et al. |
| 2023/0360392 A1 | 11/2023 | Sibley et al. |
| 2023/0363370 A1 | 11/2023 | Delatree et al. |
| 2023/0371493 A1 | 11/2023 | Werner et al. |
| 2023/0384794 A1 | 11/2023 | Brossard et al. |
| 2023/0397597 A1 | 12/2023 | Charipar et al. |
| 2023/0404056 A1 | 12/2023 | Sibley et al. |
| 2023/0413800 A1 | 12/2023 | Jasko et al. |
| 2024/0020951 A1 | 1/2024 | Redden et al. |
| 2024/0041018 A1 | 2/2024 | Mikesell et al. |
| 2024/0049697 A1 | 2/2024 | Schmeer et al. |
| 2024/0057502 A1 | 2/2024 | Sibley et al. |
| 2024/0074427 A1 | 3/2024 | Tanner |
| 2024/0155221 A1 | 5/2024 | Watanabe |
| 2024/0206451 A1 | 6/2024 | Anderson |
| 2024/0224977 A9 | 7/2024 | Leger et al. |
| 2024/0251694 A1 | 8/2024 | Sibley et al. |
| 2024/0268246 A1 | 8/2024 | Stark et al. |
| 2024/0268277 A1 | 8/2024 | Cochrane et al. |

FOREIGN PATENT DOCUMENTS

| | | | |
|---|---|---|---|
| CN | 114641666 A | 6/2022 | |
| EP | 2848119 B1 | 12/2016 | |
| EP | 3302052 B1 | 10/2019 | |
| EP | 3700337 A1 | 9/2020 | |
| EP | 3700338 A1 | 9/2020 | |
| EP | 3937628 A1 | 1/2022 | |
| EP | 4031832 A1 | 7/2022 | |
| EP | 4147942 A1 | 3/2023 | |
| EP | 4175470 A2 | 5/2023 | |
| EP | 3618609 B1 | 8/2023 | |
| EP | 4228403 A1 | 8/2023 | |
| EP | 4228404 A1 | 8/2023 | |
| EP | 4243592 A1 | 9/2023 | |
| EP | 4243613 A1 | 9/2023 | |
| EP | 4031832 A4 | 10/2023 | |
| EP | 4301135 A1 | 1/2024 | |
| EP | 4309129 A1 | 1/2024 | |
| EP | 4185106 B1 | 5/2024 | |
| EP | 4358712 A1 | 5/2024 | |
| EP | 4358713 A1 | 5/2024 | |
| EP | 4358714 A1 | 5/2024 | |
| EP | 3675621 B1 | 8/2024 | |
| EP | 3741214 B1 | 8/2024 | |
| EP | 4418845 A1 | 8/2024 | |
| JP | 201562412 A | 4/2015 | |
| JP | 2022548645 A | 11/2022 | |
| WO | 2002017705 A1 | 7/2004 | |
| WO | WO-2009126264 A2 * | 10/2009 | ......... G02B 27/0075 |
| WO | WO-2013111134 A1 * | 8/2013 | ............... A01K 1/00 |
| WO | WO-2019064062 A1 * | 4/2019 | ............... B60S 1/02 |
| WO | WO-2019079556 A1 * | 4/2019 | ........... A61B 5/0071 |
| WO | 2019144231 A1 | 8/2019 | |
| WO | 2019222109 A1 | 11/2019 | |
| WO | 2021055485 A1 | 3/2021 | |
| WO | 2022006643 A1 | 1/2022 | |
| WO | 2022043568 A2 | 3/2022 | |
| WO | 2023021769 A1 | 2/2023 | |
| WO | 2023058333 A1 | 4/2023 | |
| WO | 2023150023 A1 | 8/2023 | |
| WO | 2023180566 A1 | 9/2023 | |
| WO | 2024165111 A1 | 8/2024 | |
| WO | 2024168302 A1 | 8/2024 | |

OTHER PUBLICATIONS

Amjoud, et al., "Convolutional Neural Networks Backbones for Object Detection", Springer, ICISP 2020, LNCS 12119, 2020, pp. 282-289.

Farmwise-Flyer, "Vulcan", World Ag Expo, Feb. 14, 2023, Retrieved from the internet URL: https://farmwise.io/assets/downloads/Farmwise-Flyer-2023.pdf, 2 pages.

Gosselink, et al., "Lignin as a Renewable Aromatic Resource for the Chemical Industry", PhD Thesis, Wageningen University, Wageningen, NL, 2011, 198 pages.

Wu, et al., "Design and Implementation of Computer Vision based In-Row Weeding System", HAL Open Science. hal-01876696, 2018, 8 pages.

* cited by examiner

AUTONOMOUS LASER WEED ERADICATION

CROSS-REFERENCE

This application is a continuation of U.S. application Ser. No. 18/893,097, filed Sep. 23, 2024, which is a continuation of U.S. application Ser. No. 18/382,294, filed Oct. 20, 2023, which is a continuation of U.S. application Ser. No. 18/106,026, filed on Feb. 6, 2023, now U.S. Pat. No. 12,108,752, which is a continuation of U.S. application Ser. No. 17/022,483, filed Sep. 16, 2020, now U.S. Pat. No. 11,602,143, which claims the benefit of U.S. Provisional Application No. 62/901,641, filed Sep. 17, 2019, which applications are incorporated herein by reference in their entirety.

BACKGROUND

Agricultural output is valued at trillions of dollars annually worldwide. Agriculture is an essential component of food production and includes cultivation of both livestock and plants. Rising population and decreased crop yield due to changing climate threaten global food security. Methods for increasing agricultural production by improving crop yield and boosting labor efficiency may help mitigate food shortages.

SUMMARY

The present disclosure provides various methods, devices, modules, and systems which may be employed for automated identification, maintenance, control, or targeting of plants. For example, the methods, devices, modules, and systems disclosed herein may be used to autonomously identify and eradicate weeds located within a field of crops. The methods, devices, modules, and systems may be used as alternatives to hand cultivation or chemical herbicides. For instance, the methods, devices, modules, and systems may be used for agricultural crop management or for at-home weed control.

In various aspects, the present disclosure provides an optical control system comprising: an emitter configured to emit a beam along an optical path toward a target location on a surface, wherein the target location is determined by autonomously locating a target on the surface; a first reflective element positioned to intersect the optical path and deflect the beam; a first targeting actuator connected to the first reflective element and configured to rotate the first reflective element and deflect the beam toward the target location; and a combining element positioned in the optical path between the emitter and the first reflective element and configured to differentially deflect the beam and a scattered light from the target location traveling along the optical path in a direction opposite the beam.

In some aspects, the optical control system further comprises a targeting camera optically connected to the combining element and configured to receive the scattered light reflected off the first reflective element and image a targeting field of view including the target location. In some aspects, the optical control system is configured to direct the beam toward the target location while the optical control system is moving relative to the surface. In some aspects, the optical control system further comprises a targeting system computer configured to detect a pixel movement of the targeting field of view relative to the target location and convert from the pixel movement of the targeting field of view to a rotation of the first reflective element.

In some aspects, conversion from the pixel movement to the rotation of the first reflective element comprises referencing a calibration function. In some aspects, the calibration function is obtained by correlating locations of fiducial markers on a calibration surface to camera pixel movements.

In some aspects, the optical control system further comprises an inertial measurement unit coupled to the optical control system, wherein the inertial measurement unit is configured to measure an acceleration of the optical control system, a rotation of the optical control system relative to the surface, or a combination thereof. In some aspects, the targeting system computer is configured to adjust the target location based on an amount of time since imaging, the acceleration of the optical control system, the rotation of the optical control system relative to the surface, or a combination thereof.

In some aspects, the optical control system is enclosed in an enclosure, the enclosure comprising an escape window capable of transmitting the emission and the visible light and positioned in the optical path between the first reflective element and the surface. In some aspects, the optical control system is fully enclosed in the enclosure. In some aspects, the optical control system further comprises an air source configured to direct an air stream from an In some aspects, the enclosure further comprises a wall opposite the aperture configured to control the direction of the air stream and reduce turbulent flow without obstructing the beam.

In some aspects, the first reflective element is a mirror. In some aspects, the combining element transmits the beam and reflects the visible light. In some aspects, the emitter is a laser emitter. In some aspects, the laser emitter is selected from the group consisting of an infrared laser, an ultraviolet laser, and a visible laser. In some aspects, the optical control system further comprises a second targeting actuator connected to the first reflective element and configured to rotate the first reflective element and deflect the beam toward the target location. In some aspects, the optical control system further comprises a second reflective element positioned to intersect the optical path and deflect the beam deflected by the first reflective element, and a second targeting actuator connected to the second reflective element and configured to rotate the second reflective element and deflect the beam toward the target location. In some aspects, the first targeting actuator deflects the beam along a first axis and the second targeting actuator deflects the beam along a second axis, wherein the first axis and the second axis are orthogonal. In some aspects, the combining element is positioned after the emitter, the first reflective element is positioned after the combining element, and the second reflective element is positioned after the first reflective element relative to the direction of the beam. In some aspects, a weed is positioned at the target location.

In various aspects, the present disclosure provides a weed eradication method comprising: capturing an image of a prediction field of view with a prediction camera; locating a target in a prediction field of view; assigning the target to one of a plurality of targeting modules comprising a targeting camera having a targeting field of view overlapping with a location of the target; capturing an image of the targeting field of view with the targeting camera; locating the target in the targeting field of view; and directing a beam toward a location of the target.

In some aspects, locating the target in the prediction field of view further comprises identifying a position of the target in the prediction field of view. In some aspects, the weed eradication method further comprises identifying a region containing the target, wherein the region is defined by a polygon. In some aspects, the weed eradication method further comprises converting the position to a predicted surface location. In some aspects, the weed eradication method further comprises determining a desired movement in the targeting field of view. In some aspects, the weed eradication method further comprises converting the desired movement to an actuator position change. In some aspects, locating the target comprises identifying a target using a trained neural net. In some aspects, the trained neural net is capable of providing a bounding box, a polygon mask, or a combination thereof around the target. In some aspects, the trained neural net is trained with images of fields.

In some aspects, locating the target in the targeting field of view further comprises referencing a calibration function obtained by correlating locations of fiducial markers on a calibration surface to camera pixel coordinates and correcting the location of the target. In some aspects, assigning the target to one of the plurality of targeting modules comprises providing the location of the target to one of the plurality of targeting modules. In some aspects, directing a beam toward the location of the target further comprises referencing a calibration function obtained by correlating pixel movements of fiducial markers on a calibration surface to actuator tilt values and correcting the actuator tilt values. In some aspects, the weed eradication method further comprises deactivating the beam once the target has been damaged or killed.

In some aspects, capturing an image of the targeting field of view with the targeting camera, locating the target in the targeting field of view, and directing a beam toward a location of the target are performed with high accuracy. In some aspects, the target is a weed.

In some aspects, the weed eradication method further comprises damaging or killing the weed. In some aspects, damaging or killing the weed comprises irradiating the weed. In some aspects, damaging or killing the weed comprises burning the weed. In some aspects, locating the target comprises differentiating between the weed and a desired plant.

In various aspects, the present disclosure provides a targeting system comprising a prediction module, a targeting module, and an optical control module; the prediction module comprising: a prediction camera configured to image a prediction field of view on a surface and to locate a target in the prediction field of view, and a prediction module controller configured to convert a location of the target in the prediction field of view to a predicted location on the surface and assign the target to the targeting module; the targeting module comprising: a targeting module controller configured to convert the predicted location to a position of a targeting actuator; and the optical control module comprising: an emitter configured to emit a beam along an optical path toward the target, and the targeting actuator configured to receive position information from the targeting module controller and deflect the beam toward the target.

In some aspects, the targeting system further comprises a targeting camera configured to image a targeting field of view on the surface and to locate the target in the targeting field of view. In some aspects, the optical control module further comprises: a first reflective element controlled by the targeting actuator and positioned to intersect the optical path and deflect the beam, and a combining element positioned in the optical path between the emitter and the first reflective element and configured to differentially deflect the beam and a scattered light from the targeting field of view traveling along the optical path in a direction opposite the beam.

In some aspects, the optical control module is configured to direct the beam toward the target while the targeting system is moving relative to the surface. In some aspects, the targeting module is configured to detect a pixel movement of the targeting field of view relative to the target and convert from the pixel movement of the targeting field of view to a motion of the targeting actuator.

In some aspects, the targeting system further comprises an inertial measurement unit configured to measure an acceleration of the targeting system and a rotation of the targeting system relative to the surface. In some aspects, the targeting module is configured to adjust the predicted location based on an amount of time since imaging, an acceleration of the targeting system, a rotation of the targeting system relative to the surface, or a combination thereof. In some aspects, the targeting system further comprises a second targeting module comprising: a second targeting camera configured to image a second targeting field of view on the surface and to locate the target in the second targeting field of view, and a targeting module controller configured to convert a location of the target in the second targeting field of view to a position of a second targeting actuator. In some aspects, the prediction field of view comprises the targeting field of view.

In some aspects, the targeting system further comprises a vehicle transporting the prediction camera and the optical control module. In some aspects, the vehicle is an autonomous vehicle. In some aspects, the vehicle comprises a plurality of wheels.

In some aspects, the optical control module is enclosed in an enclosure, the enclosure comprising an escape window capable of transmitting the emission and the visible light and positioned in the optical path between the first reflective element and the surface. In some aspects, the optical control module is fully enclosed in the enclosure. In some aspects, the targeting system further comprises an air source configured to direct an air stream from an aperture in an external surface of the enclosure toward an exterior surface of the escape window. In some aspects, the enclosure further comprises a wall opposite the aperture configured to control the direction of the air stream and reduce turbulent flow without obstructing the beam.

In some aspects, the first reflective element is a mirror. In some aspects, the combining element transmits the beam and reflects the visible light. In some aspects, the emitter is a laser emitter. In some aspects, the laser emitter is selected from the group consisting of an infrared laser, an ultraviolet laser, and a visible laser. In some aspects, the optical control module further comprises a second targeting actuator connected to the first reflective element and configured to rotate the first reflective element and deflect the beam toward the target. In some aspects, the optical control module further comprises a second reflective element positioned to intersect the optical path and deflect the beam deflected by the first reflective element, and a second targeting actuator connected to the second reflective element and configured to rotate the second reflective element and deflect the beam toward the target. In some aspects, the first targeting actuator deflects the beam along a first axis and the second targeting actuator deflects the beam along a second axis, wherein the first axis and the second axis are orthogonal. In some aspects, the combining element is positioned after the emitter, the first reflective element is positioned after the combining element, and the second reflective element is positioned after the first reflective element relative to the direction of the beam.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Cultivation of crops is essential for food and textile production. One important component of crop management is the control or elimination of undesirable plant species, commonly referred to as weeds. Weeds may decrease crop yield by depriving a desired plant of resources including water, nutrients, sunlight, and space. Weeds may further interfere with crop growth by harboring pests or parasites that damage the desired plants. Traditional weed control and eradication methods include hand cultivation or chemical herbicides. Hand cultivation is labor intensive, leading to increased cost of crop production and higher food and textile prices. Use of chemical herbicides may have negative environmental impacts including ground water contamination, acute toxicity, or long-term health effects such as cancer.

Development of eco-friendly and low-cost weed control and eradication methods is important for higher crop yield, lower food prices, and long-term environmental stability. Reducing or eliminating the need for herbicides may decrease many of the negative environmental side-effects of crop production, including toxic run-off and ground water contamination. Decreasing the need for manual labor may substantially lower farming costs and improve labor standards.

The present disclosure provides various methods, devices, modules, and systems which may be employed for automated identification, maintenance, control, or targeting of plants. In some embodiments, the methods, devices, modules, and systems disclosed herein may be used to autonomously identify and eradicate weeds located within a field of crops. For example, disclosed herein are particular methods for autonomously locating, identifying, and targeting objects, for example weeds, with a beam comprising electromagnetic radiation. Also disclosed herein are devices configured to locate, identify, and autonomously target the objects with a beam. The devices may be used, for example, to control or eliminate weeds. For example, the devices may be used to burn or irradiate weeds. The modules disclosed herein may be used for autonomous control of the devices and systems disclosed herein to implement the methods disclosed herein, for example to locate, identify, target, and control or eliminate weeds. The systems disclosed herein may comprise devices, modules, and methods configured to autonomously control or eliminate an object, for example a weed, by locating, identifying, and targeting the object with an emission. Sometimes, the methods, devices, modules, and systems may be used for agricultural crop management or for at-home weed control. The methods, devices, modules, and systems may be used as alternatives to hand cultivation or chemical herbicides.

Optical Control Systems

Figure 1A:
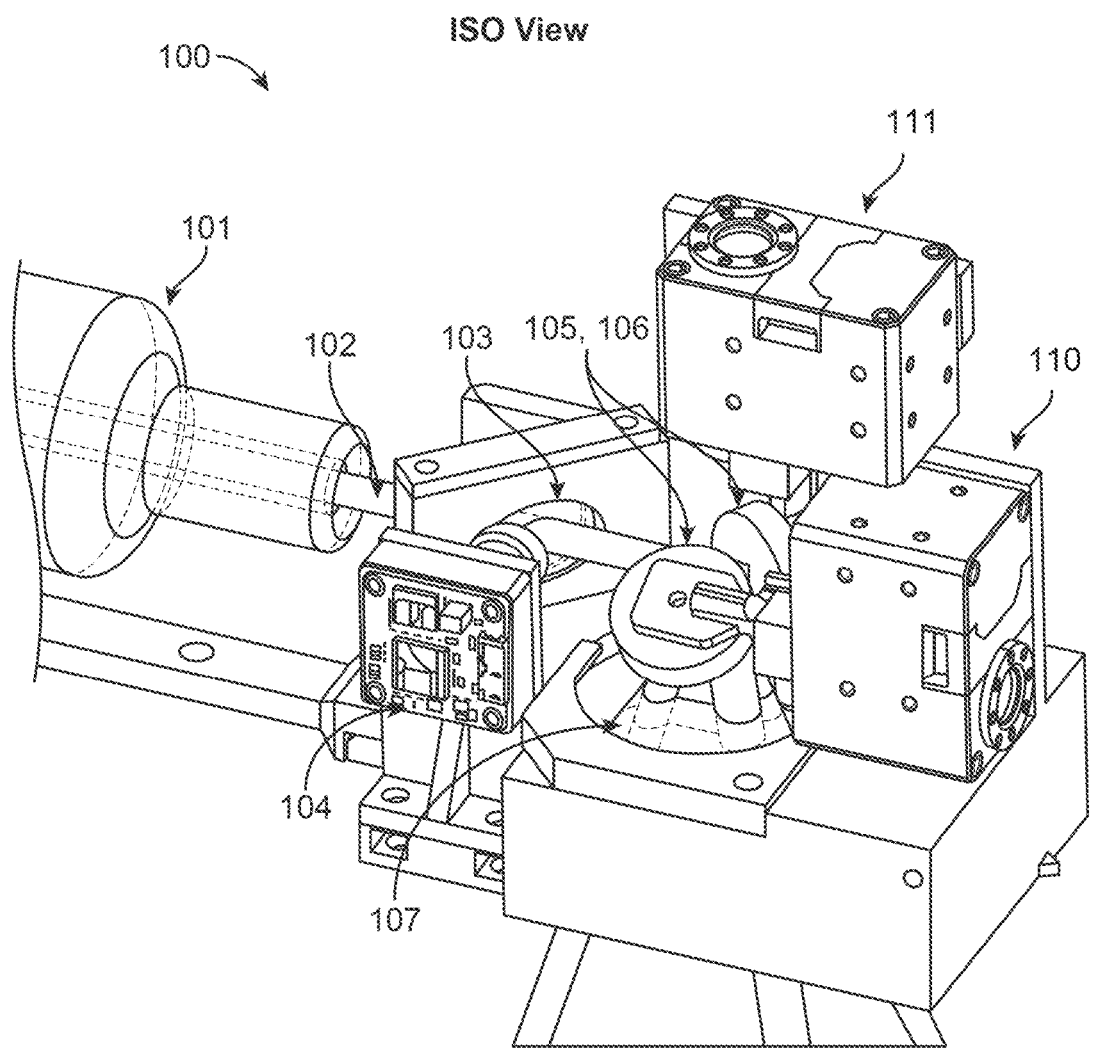
FIG. 1A illustrates an isometric view of a laser targeting system, in accordance with one or more embodiments herein.

Described herein are optical control systems for directing a beam, for example a light beam, toward a target location on a surface. FIG. 1A illustrates an isometric view of an embodiment of an optical control system 100 as disclosed herein. An emitter 101 is configured to direct a beam along an optical path 102. In some embodiments, the beam comprises electromagnetic radiation, for example light, radio waves, microwaves, or x-rays. In some embodiments, the light is visible light, infrared light, or ultraviolet light. The beam may be coherent. In a preferred embodiment, the emitter is a laser such as an infrared laser. In some embodiments, the emitter emits a beam having a wavelength of about 1 m, about 100 mm, about 10 mm, about 1 mm, about 100 µm, about 10 µm, about 1.5 µm, about 1 µm, about 900 nm, about 800 nm, about 700 nm, about 600 nm, about 500 nm, about 400 nm, about 300 nm, about 100 nm, about 10 nm, or about 1 nm. In some embodiments, the emitter emits a beam having a wavelength from about 1 m to about 100 mm, from about 100 mm to about 10 mm, from about 10 mm to about 1 mm, from about 1 mm to about 100 µm, from about 100 µm to about 10 µm, from about 10 µm to about 1.5 µm, from about 1.5 µm to about 1 µm, from about 1 µm to about 900 nm, from about 900 nm to about 800 nm, from about 800 nm to about 700 nm, from about 700 nm to about 600 nm, from about 600 nm to about 500 nm, from about 500 nm to about 400 nm, from about 400 nm to about 300 nm, from about 300 nm to about 100 nm, from about 100 nm to about 10 nm, or from about 10 nm to about 1 nm. In some embodiments, the emitter may be capable of emitting electromagnetic radiation up to 10 mW, up to 100 mW, up to 1 W, up to 10 W, up to 100 W, up to 1 kW, or up to 10 kW. In some embodiments, the emitter may be capable of emitting electromagnetic radiation from 10 mW to 100 mW, from 100 mW to 1 W, from 1 W to 10 W, from 10 W to 100 W, from 100 W to 1 kW, or from 1 kW to 10 kW.

Figure 1B:
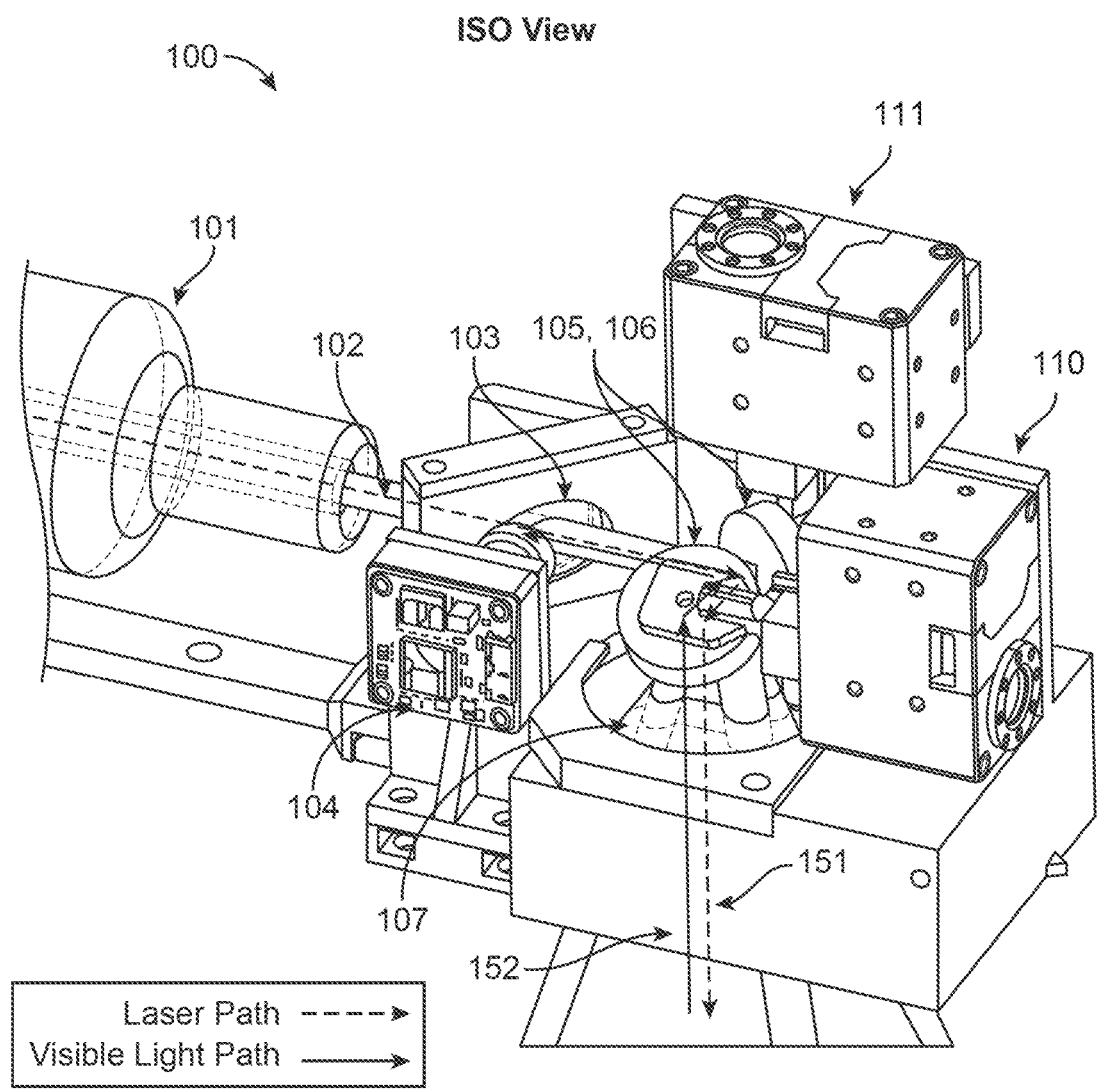
FIG. 1B illustrates an isometric view of a laser targeting system with the laser path and visible light path indicated, in accordance with one or more embodiments herein.

FIG. 1B shows an isometric view of the embodiment of the optical control device 100 shown in FIG. 1A, and further illustrates the position and direction of the beam path 102. Reference numbering is consistent between FIG. 1A and FIG. 1B. One or more optical elements may be positioned in a path of the beam. Said optical elements may comprise one or more of a beam combiner 103, a first reflective element 105, and a second reflective element 106. The elements may be configured in the order of the beam combiner 103, followed by the first reflective element 105, followed by the second reflective element 106, in the direction of the beam path. In another example, one or both of the first reflective element or the second reflective element may be configured before the beam combiner, in order of the direction of the beam path. In another example, the optical elements may be configured in the order of the beam combiner 103, followed by the first reflective element 105 in order of the direction of the beam path. In another example, one or both of the first reflective element or the second reflective element may be configured before the beam combiner, in the direction of the beam path. Any number of additional reflective elements may be positioned in the beam path.

The beam combiner may also be referred to as a beam combining element. In some embodiments, the beam combiner 103 may be a zinc selenide (ZnSe), zinc sulfide (ZnS), or germanium (Ge) beam combiner. For example, the beam combiner may be configured to transmit infrared light and reflect visible light. In some embodiments, the beam combiner 103 may be a dichroic. In some embodiments, the beam combiner may be configured to pass electromagnetic radiation having a wavelength longer than a cutoff wavelength and reflect electromagnetic radiation having a wavelength shorter than the cutoff wavelength. In some embodiments, the beam combiner may be configured to pass electromagnetic radiation having a wavelength shorter than a cutoff wavelength and reflect electromagnetic radiation having a wavelength longer than the cutoff wavelength. In some embodiments, the cutoff wavelength may be about 1 m, about 100 mm, about 10 mm, about 1 mm, about 100 µm, about 10 µm, about 1.5 µm, about 1 µm, about 900 nm, about 800 nm, about 700 nm, about 600 nm, about 500 nm, about 400 nm, about 300 nm, about 100 nm, about 10 nm, or about 1 nm. In some embodiments, the cutoff wavelength may be from about 1 m to about 100 mm, from about 100 mm to about 10 mm, from about 10 mm to about 1 mm, from about 1 mm to about 100 µm, from about 100 µm to about 10 µm, from about 10 µm to about 1.5 µm, from about 1.5 µm to about 1 µm, from about 1 µm to about 900 nm, from about 900 nm to about 800 nm, from about 800 nm to about 700 nm, from about 700 nm to about 600 nm, from about 600 nm to about 500 nm, from about 500 nm to about 400 nm, from about 400 nm to about 300 nm, from about 300 nm to about 100 nm, from about 100 nm to about 10 nm, or from about 10 nm to about 1 nm. In other embodiments, the beam combiner may be a polarizing beam splitter, a long pass filter, a short pass filter, or a band pass filter.

The positions and orientations of one or both of the first reflective element 105 and the second reflective element 106 may be controlled by actuators. In some embodiments, an actuator may be a motor, a solenoid, a galvanometer, or a servo. For example, the position of the first reflective element may be controlled by a first actuator 110, and the position and orientation of the second reflective element may be controlled by a second actuator 111. In some embodiments, a single reflective element may be controlled by a plurality of actuators. For example, the first reflective element may be controlled by a first actuator along a first axis and a second actuator along a second axis. In some embodiments, a single actuator may control a reflective element along a plurality of axes. An actuator may change a position of a reflective element by rotating the reflective element, thereby changing an angle of incidence of a beam encountering the reflective element. Changing the angle of incidence may cause a translation of the position at which the beam encounters the surface. In some embodiments, the angle of incidence may be adjusted such that the position at which the beam encounters the surface is maintained while the optical system moves with respect to the surface. In some embodiments, the first actuator rotates the first reflective element about a first rotational axis, thereby translating the position at which the beam encounters the surface along a first translational axis, and the second actuator rotates the second reflective element about a second rotational axis, thereby translating the position at which the beam encounters the surface along a second translational axis. In some embodiments, a first actuator and a second actuator rotate a first reflective element about a first rotational axis and a second rotational axis, thereby translating the position at which the beam encounters the surface of the first reflective element along a first translational axis and a second translational axis. For example, a single reflective element may be controlled by a first actuator and a second actuator, providing translation of the position at which the beam encounters the surface along a first translation axis and a second translation axis with a single reflective element controlled by two actuators. The first translational axis and the second translational axis may be orthogonal. A coverage area on the surface may be defined by a maximum translation along the first translational axis and a maximum translation along the second translation axis. One or both of the first actuator and the second actuator may be servo-controlled, piezoelectric actuated, piezo inertial actuated, stepper motor-controlled, galvanometer-driven, linear actuator-controlled, or any combination thereof. One or both of the first reflective element and the second reflective element may be a mirror; for example, a dichroic mirror, or a dielectric mirror; a prism; a beam splitter; or any combination thereof. In some embodiments, one or both of the first reflective element and the second reflective element may be any element capable of deflecting the beam.

Figure 2:
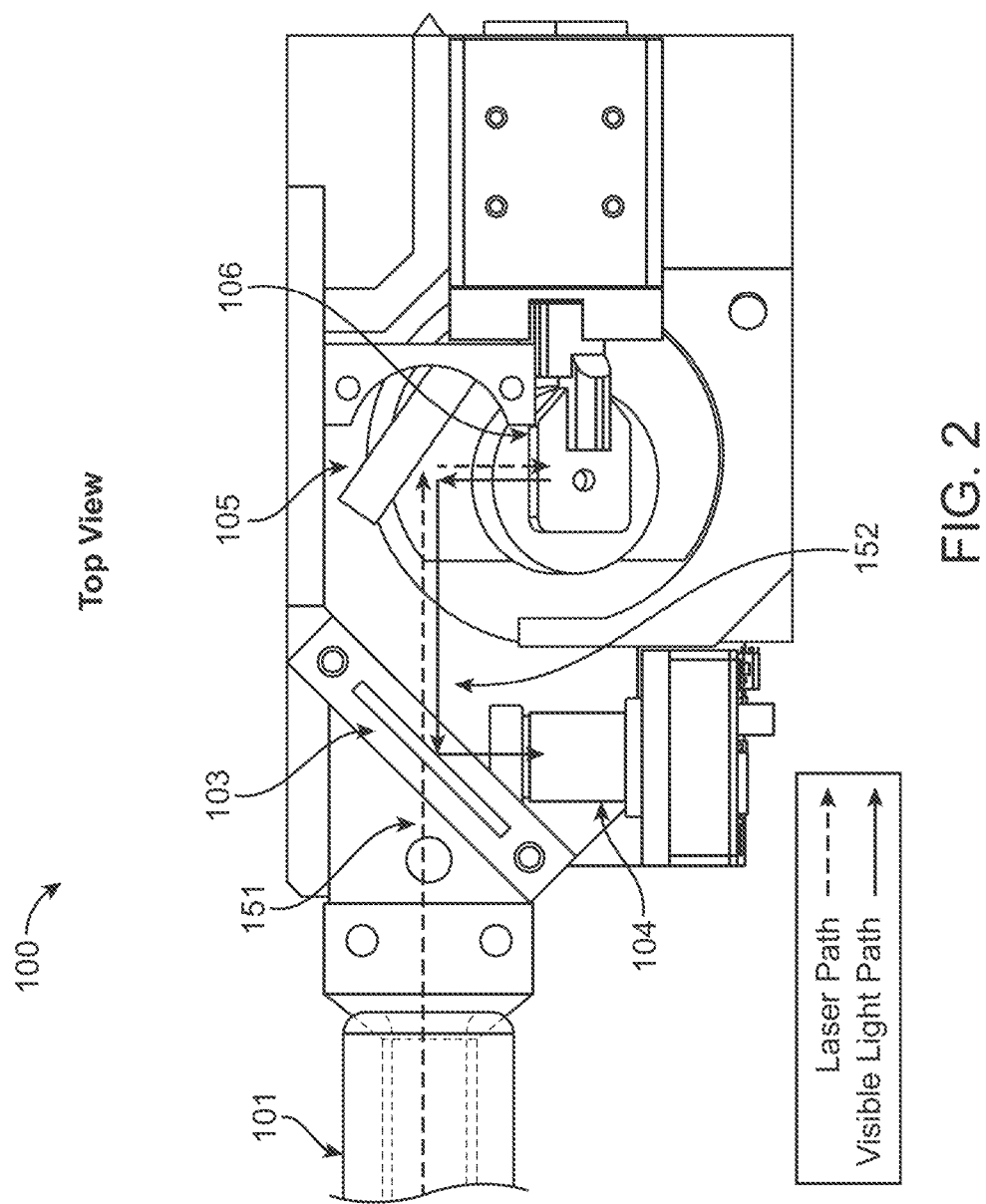
FIG. 2 illustrates a top view of a laser targeting system with the laser path and visible light path indicated, in accordance with one or more embodiments herein.

FIG. 2 shows a top view of an embodiment of an optical control system 100 as shown in FIG. 1A and FIG. 1B. Reference numbers are consistent between FIG. 1A, FIG. 1B, and FIG. 2. A targeting camera 104 may be positioned to capture light 152, for example visible light, traveling along the optical path in a direction opposite the beam path 151. The light may be scattered by a surface, such as the surface comprising a target. In some embodiments, the targeting camera is positioned such that it captures light reflected off of the beam combiner 103. In other embodiments, the targeting camera is positioned such that it captures light transmitted through the beam combiner. The targeting camera may be configured to image a target field of view 504 (FIG. 5) on a surface. The targeting camera may be coupled to the beam combiner, or the targeting camera may be coupled to a support structure supporting the beam combiner. In a preferred embodiment, the targeting camera does not move with respect to the beam combiner.

Figure 3A:
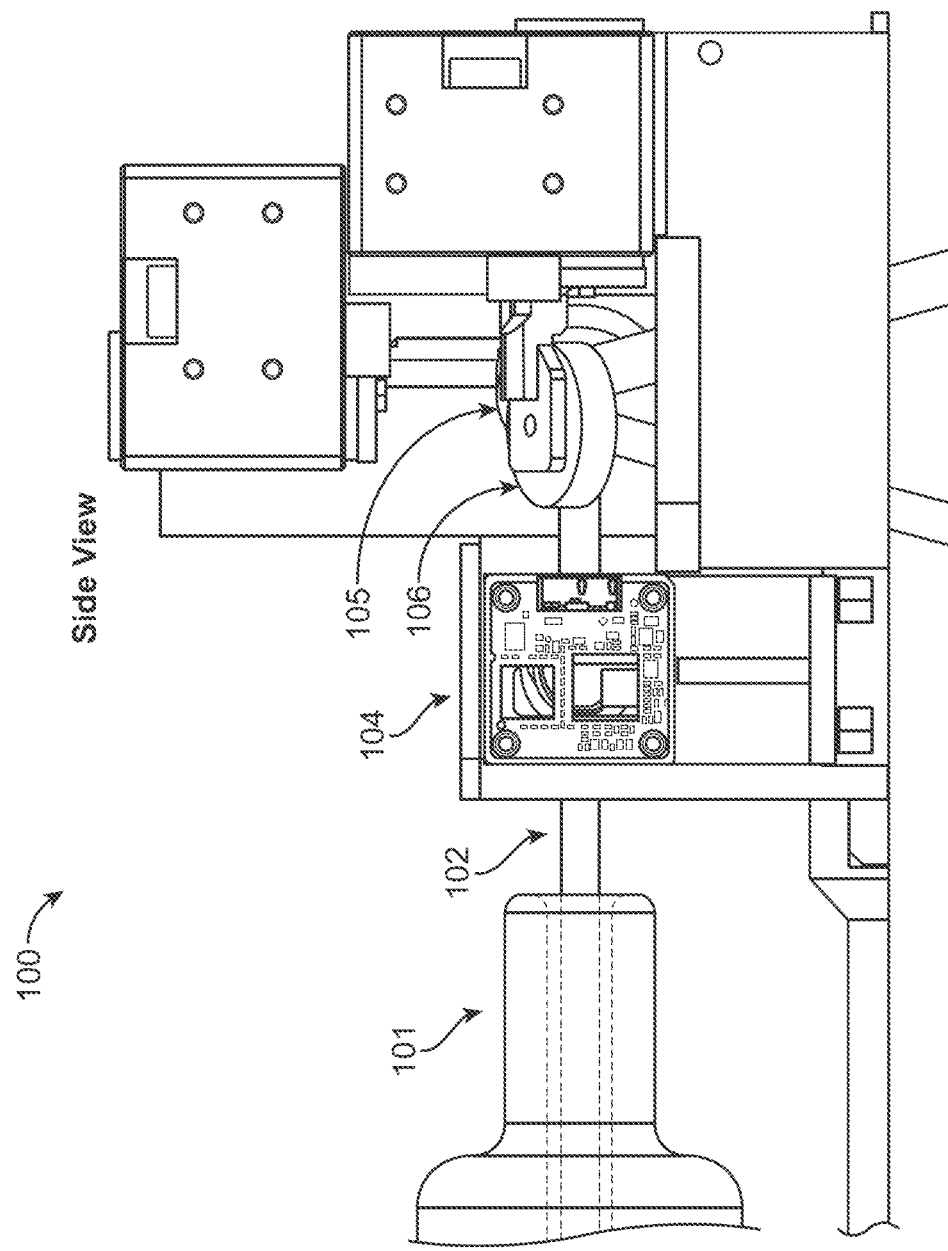
FIG. 3A illustrates a side view of a laser targeting system, in accordance with one or more embodiments herein.
Figure 3B:
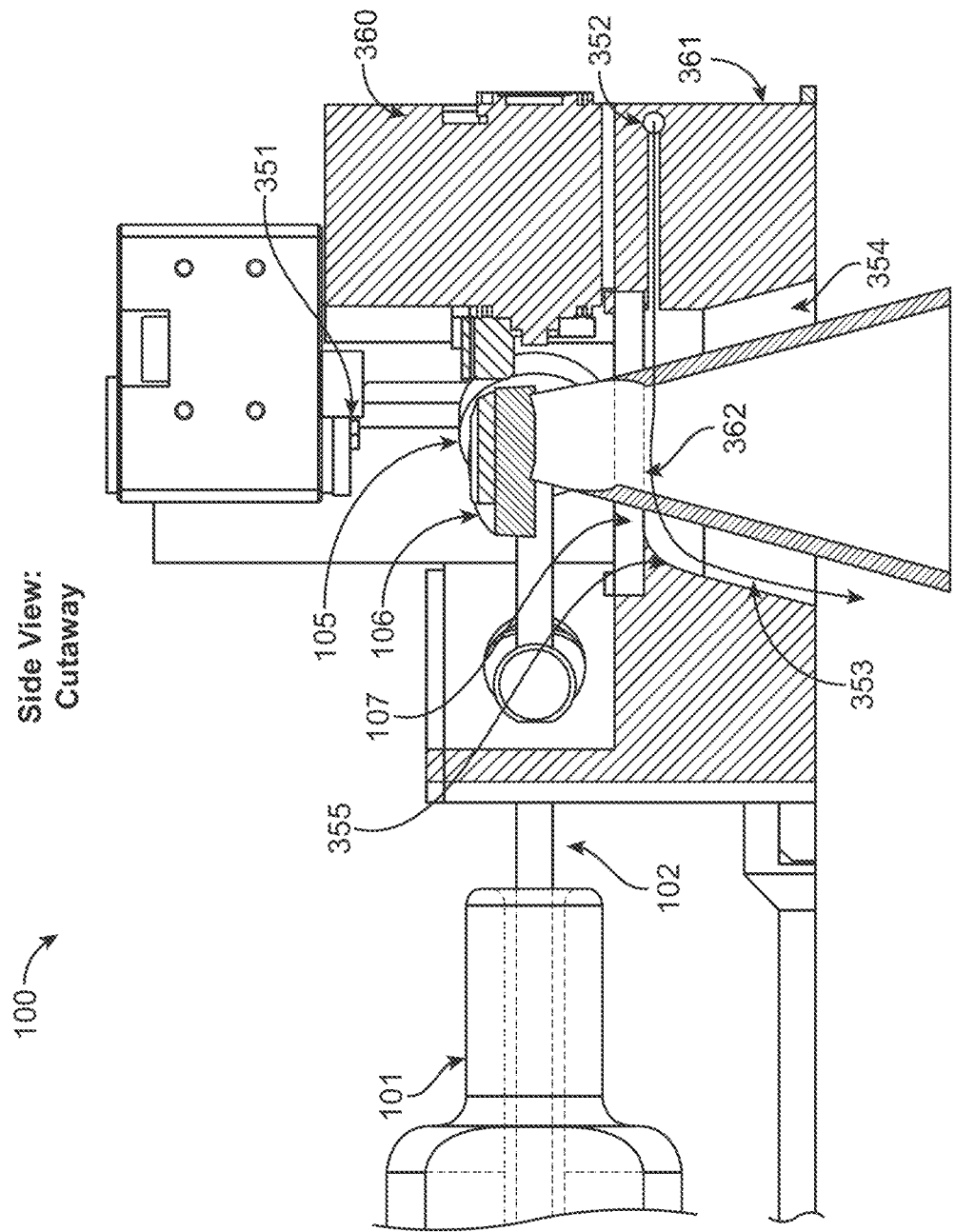
FIG. 3B illustrates a side view cutaway of a laser targeting system with the clean air path indicated, in accordance with one or more embodiments herein.

FIG. 3A and FIG. 3B show a side view of an embodiment of the optical control device disclosed herein. Reference numbering is consistent between FIG. 1-3. FIG. 3B illustrates a mechanism for preventing dust and debris accumulation on the optical elements of the optical control device shown in FIG. 1-3. In some embodiments, the optical elements may comprise hard stops 351 on mirrors to prevent the beam from hitting regions of the optical control device outside of a predefined boundary on the surface. The optical elements, for example the beam combining element and one or both of the reflective elements, may be protected by an enclosure 360. The optical elements may be surrounded by the enclosure. In some embodiments, the enclosure is sealed to prevent dust, debris, water, or any combination thereof from contacting the optical elements. The enclosure may comprise a laser escape window 107, as shown in FIG. 3B. In some embodiments, the laser escape window is positioned to intersect the beam after the second reflective element in the beam path, or the laser escape window is positioned to intersect the beam after the first reflective element in the beam path. In some embodiments, the laser escape window is the last element in the beam path. The laser escape window may prevent dust, debris, water, or any combination thereof from reaching the optical elements. In some embodiments, the laser escape window comprises a material that is substantially transparent to electromagnetic radiation, such as light. For example, the laser escape window may comprise glass, quartz, fused silica, zinc selenide, a transparent polymer, or a combination thereof.

The enclosure may further comprise a self-cleaning device configured to prevent accumulation of dust or debris on the surface of the laser escape window or to remove dust or debris that has accumulated on the surface of the laser escape window. In some embodiments, the self-cleaning device comprises an aperture 352 in an external surface of the enclosure 361 configured to discharge clean air 353. The clean air may prevent debris from damaging the laser escape window. In some embodiments, the clean air may be filtered. The aperture may be configured to direct an air stream from toward an exterior surface of the escape window 362. The aperture may be configured such that the clean air is directed across the surface of the laser escape window. In some embodiments, the enclosure is configured to guide the clean air without obstructing the beam 102. For example, the enclosure may comprise an opening 354 after the laser escape window in the beam path having clearance such that the beam may pass unobstructed. In some embodiments, the opening comprises a wall opposite the aperture. The wall may be configured to control the direction of the air stream and reduce turbulent flow without obstructing the beam. The opening may encompass the laser escape window and the beam path, and be configured so that the opening is narrower close to the laser escape window and wider farther from the laser escape window in the direction of the beam path. In some embodiments, the opening has smooth corners 355 to allow passage of the clean air while preventing turbulent flow.

Figure 4B:
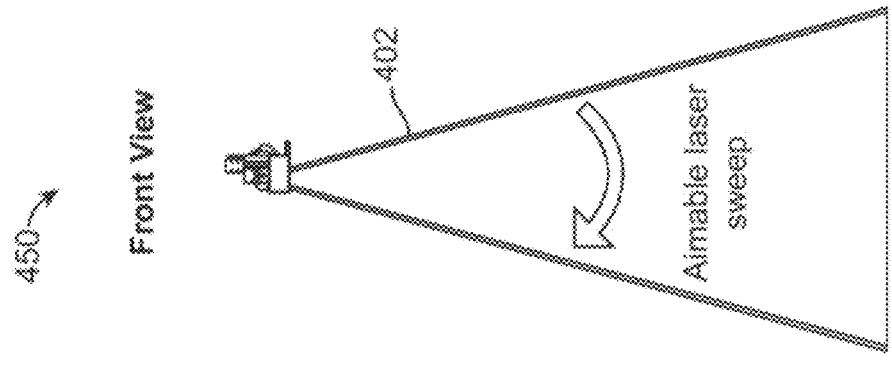
FIG. 4B illustrates a front view of a targeting laser and targeting coverage area of the targeting laser, in accordance with one or more embodiments herein.
Figure 4A:
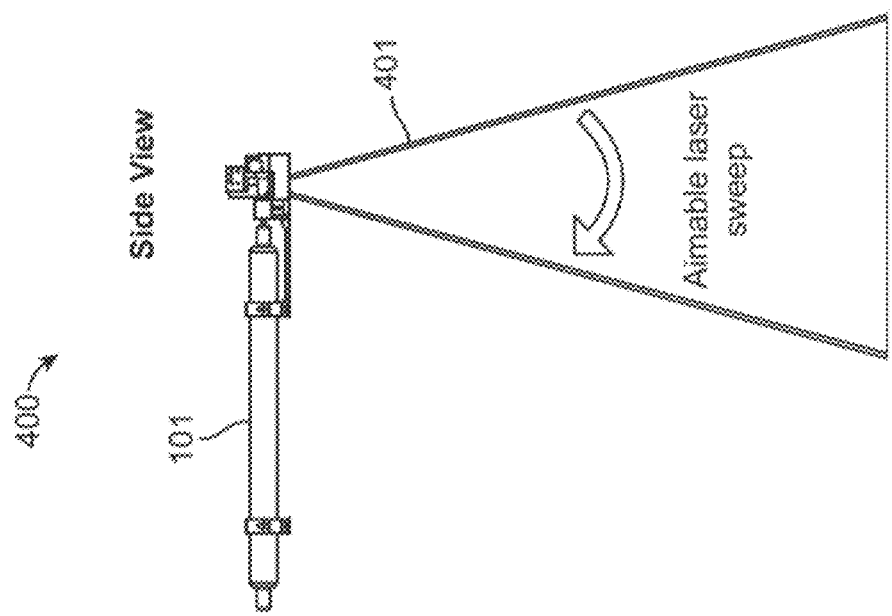
FIG. 4A illustrates a side view of a targeting laser and targeting coverage area of the targeting laser, in accordance with one or more embodiments herein.

After exiting the optical control system, the beam 102 may be directed toward a surface, as shown in FIG. 4A and FIG. 4B. In some embodiments, the surface comprises a target, for example a weed. Rotational motions of one or both of the reflective elements 105 and 106, as shown in FIG. 2, may produce a laser sweep along a first translational axis 401 and a laser sweep along a second translational axis 402, as show in view 400 and 450 of FIG. 4A and FIG. 4B, respectively. The rotational motions of one or both of the reflective elements may control the location at which the beam encounters the surface. For example, the rotation motions of one or both of the reflective elements may move the location at which the beam encounters the surface to a position of a target on the surface. In some embodiments, the beam is configured to damage the target. For example, the beam may comprise electromagnetic radiation, and the beam may irradiate the target. In another example, the beam may comprise infrared light, and the beam may burn the target. In some embodiments, one or both of the reflective elements may be rotated such that the beam scans an area surrounding and including the target.

Compound Systems

Figure 5:
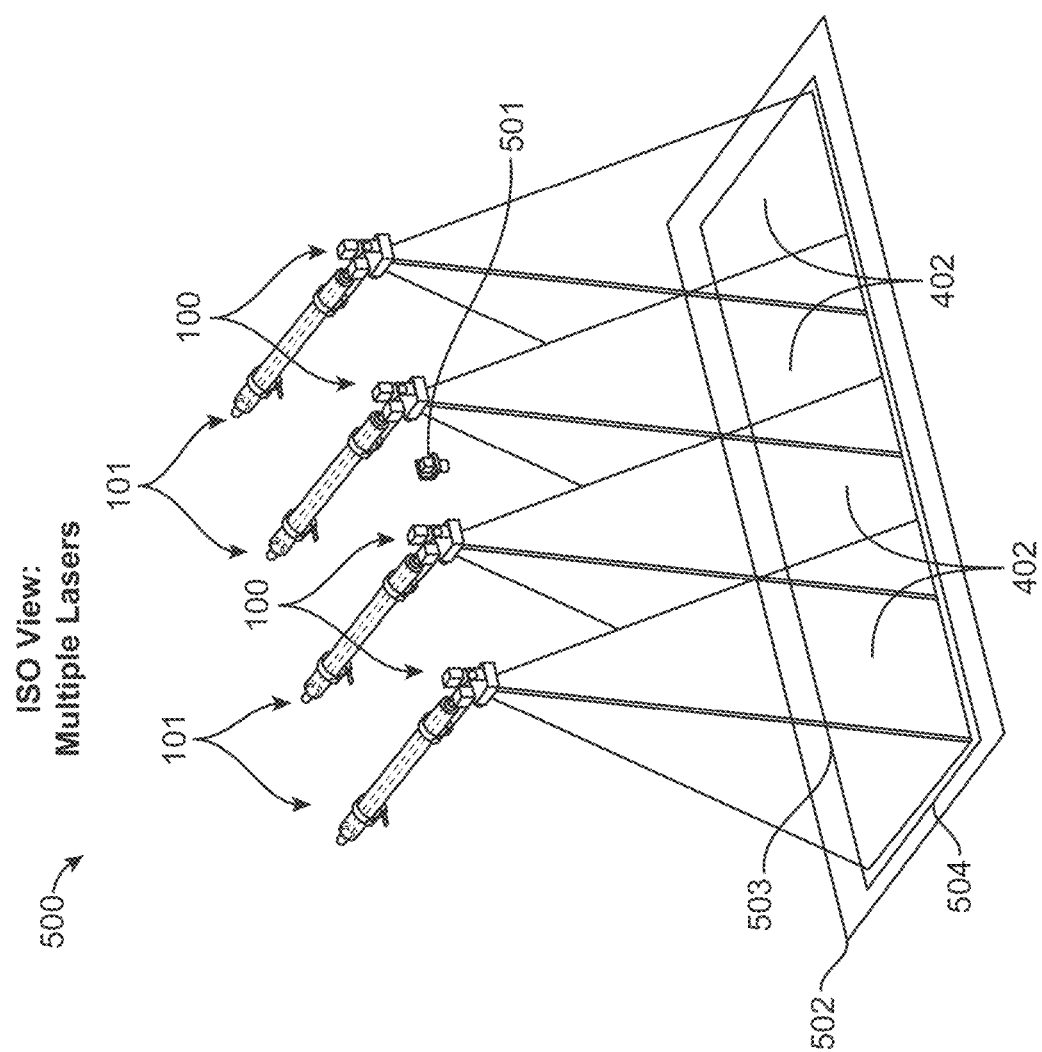
FIG. 5 illustrates an isometric view of a prediction camera, multiple targeting lasers, prediction view area of the prediction camera, and targeting coverage area of the targeting lasers, in accordance with one or more embodiments herein.

In some embodiments, a plurality of optical control systems may be combined to increase a coverage area on a surface. FIG. 5 illustrates a compound system 500 comprising a plurality of optical control systems 100. The plurality of optical control systems are configured such that the laser sweep along a translational axis 402 of each optical control system overlaps with the laser sweep of along the translational axis of the neighboring optical control system. The combined laser sweep defines a coverage area 503 that may be reached by at least one beam of a plurality of beams from the plurality of optical control systems. A prediction camera 501 may be positioned such that a prediction camera field of view 502 fully encompasses the coverage area 503.

Figure 6:
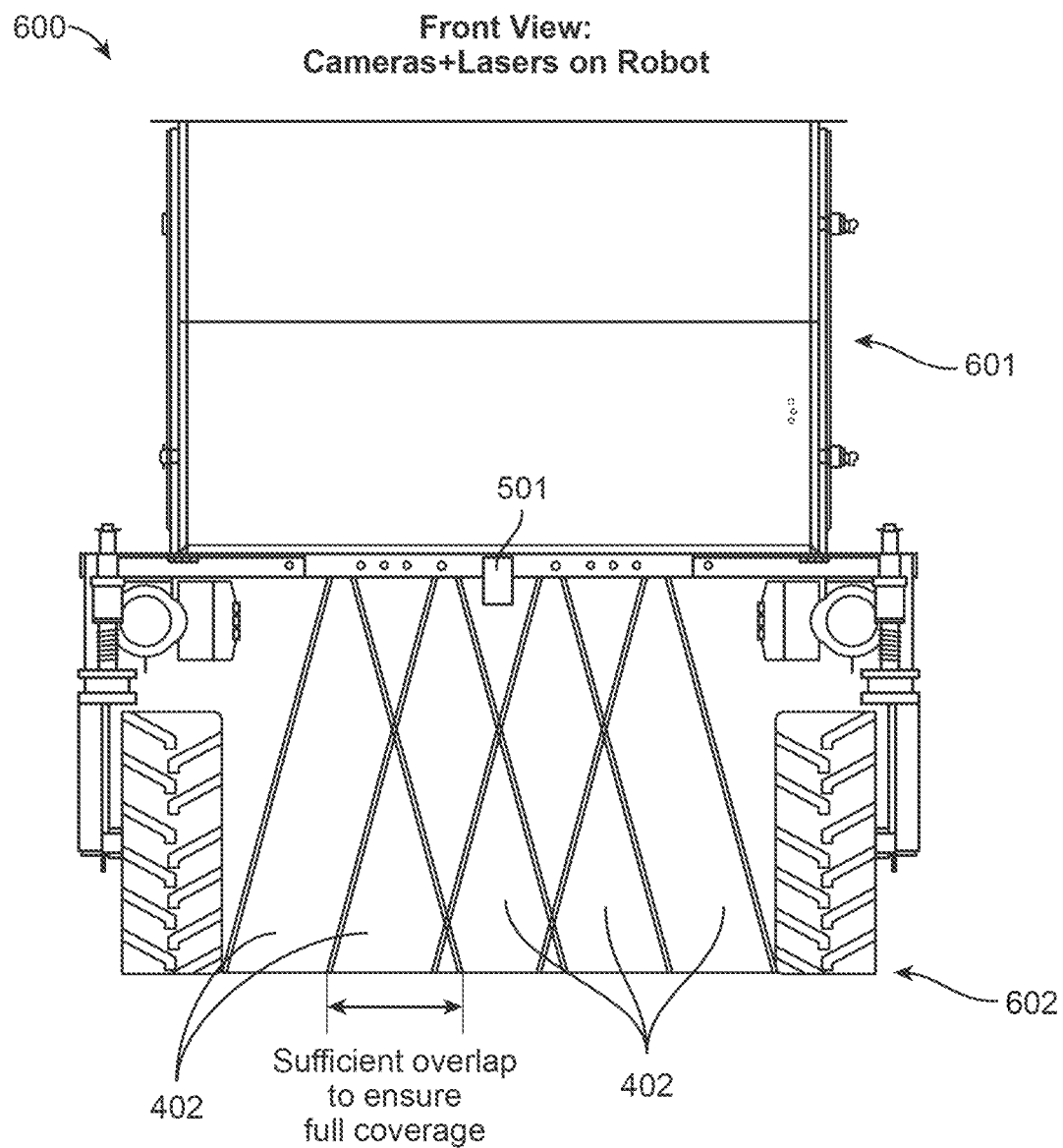
FIG. 6 illustrates a front view of an autonomous laser weed eradication robot, a prediction camera, and coverage area of multiple targeting lasers, in accordance with one or more embodiments herein.
Figure 7:
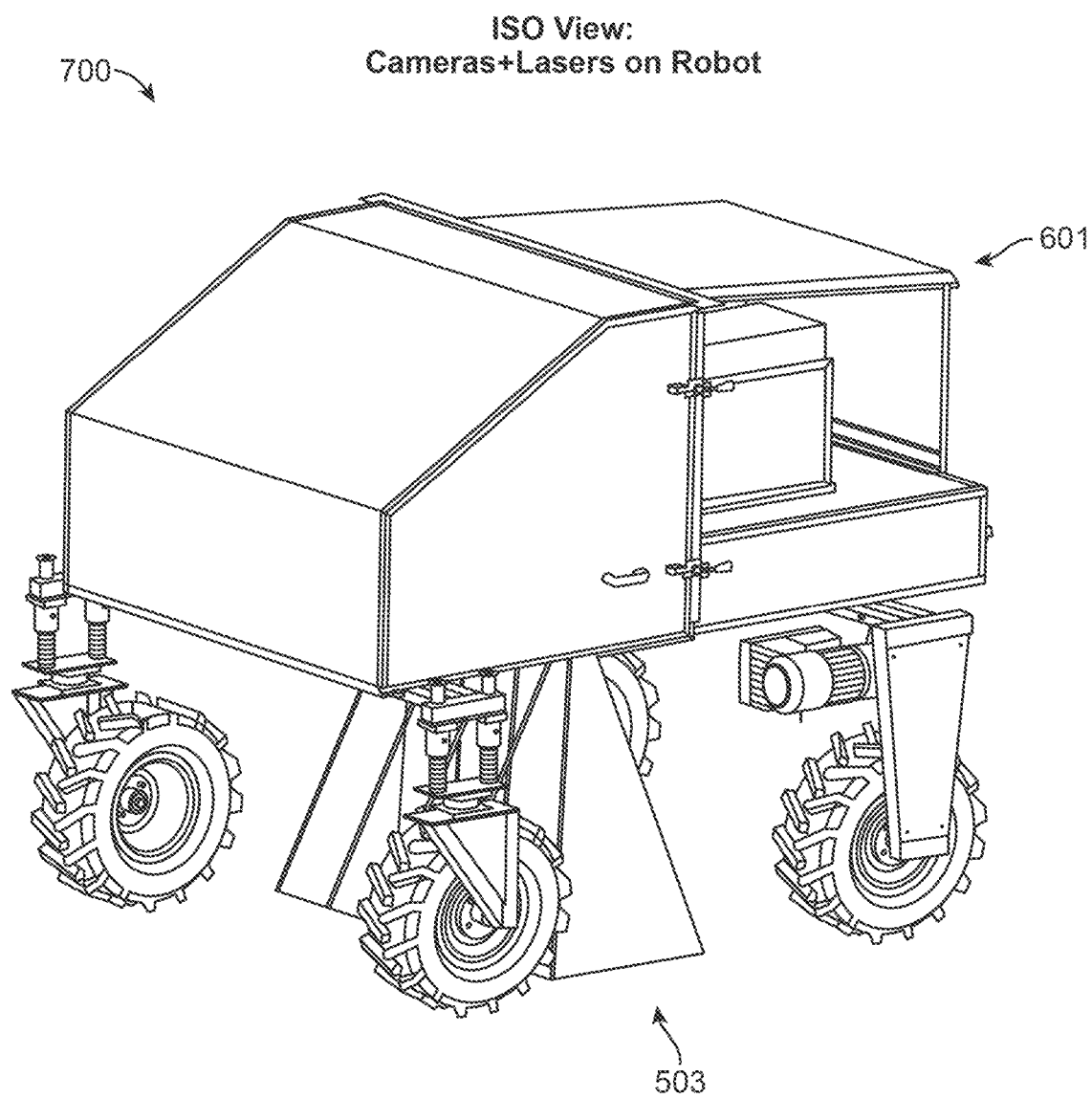
FIG. 7 illustrates an isometric view of an autonomous laser weed eradication robot, a prediction camera, and coverage area of multiple targeting lasers, in accordance with one or more embodiments herein.

The plurality of optical control systems may be configured on a vehicle 601, as shown in view 600 of FIG. 6 and in view 700 of FIG. 7. For example, the vehicle may be an autonomous vehicle. The autonomous vehicle may be a robot. In some embodiments, the vehicle may be controlled by a human. For example, the vehicle may be driven by a human driver. In some embodiments, the vehicle may be coupled to a second vehicle being driven by a human driver, for example towed behind or pushed by the second vehicle. The vehicle may be controlled by a human remotely, for example by remote control. In some embodiments, the vehicle may be controlled remotely via longwave signals, optical signals, satellite, or any other remote communication method. The plurality of optical control systems may be configured on the vehicle such that the coverage area overlaps with a surface 602 underneath, behind, in front of, or surrounding the vehicle. The vehicle may be configured to navigate a surface comprising a plurality of targets, for example a crop field comprising a plurality of weeds. The vehicle may comprise one or more of a plurality of wheels, a power source, a motor, a prediction camera 501, or any combination thereof. In some embodiments, the vehicle has sufficient clearance above the surface to drive over a plant, for example a crop, without damaging the plant. In some embodiments, a space between an inside edge of a left wheel and an inside edge of a right wheel is wide enough to pass over a row of plants without damaging the plants. In some embodiments, a distance between an outside edge of a left wheel and an outside edge of a right wheel is narrow enough to allow the vehicle to pass between two rows of plants, for example two rows of crops, without damaging the plants. In a preferred embodiment, the vehicle comprising the plurality of wheels, the plurality of optical control systems, and the prediction camera may navigate rows of crops and emit a beam of the plurality of beams toward a target, for example a weed, thereby burning or irradiating the weed.

Prediction Modules

Figure 8:
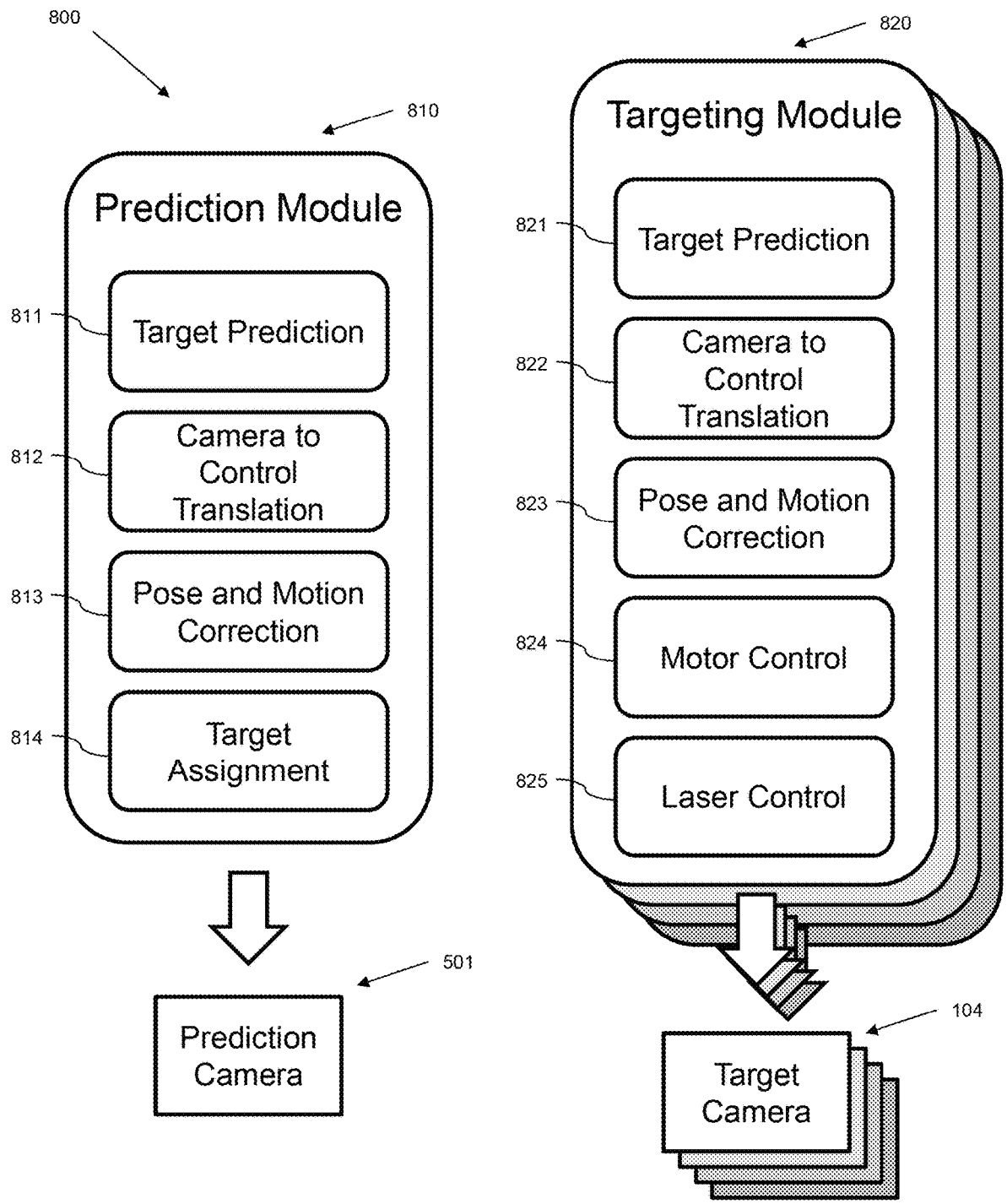
FIG. 8 depicts a method of identifying, assigning, and targeting a target, in accordance with one or more embodiments herein.

Disclosed herein is a prediction module configured to locate targets on a surface. FIG. 8 illustrates a prediction module 810 configured to identify, assign, and target a target. In some embodiments, a target prediction system 811 is configured to capture an image of a prediction field of view comprising surface using a prediction camera 501, identify a target in the image, and locate the target in the prediction field of view. A camera to control translation system 812 may be configured to translate the location of the target in the prediction field of view into a position on the surface. For example, the camera to control translation system may build multiple interpolation functions which provide a translation from the location in the prediction field of view to one or more actuator positions, for example pan and tilt positions, of one or more actuators controlling one or more reflective elements 105 and 106, as shown in FIG. 1-3.

The prediction module 810 shown in FIG. 8 may further comprise a pose and motion correction system 813. The pose and motion correction system may comprise a positioning system, for example an Inertial Measurement Unit (IMU), a Global Positioning System (GPS), or an Internal Navigation System (INS). The pose and motion correction system may utilize an Inertial Measurement Unit (IMU) which may be directly or indirectly coupled to the prediction camera. For example, the prediction camera and the IMU may be mounted to a vehicle. The IMU may collect motion readings of the IMU, and anything directly or indirectly coupled to the IMU, such as the prediction camera. For example, the IMU may collect readings comprising three-dimensional acceleration and three-dimensional rotation information which may be used to determine a magnitude and a direction of motion over an elapsed time. The pose and motion correction system may comprise a Global Positioning System (GPS). The GPS may be directly or indirectly coupled to the targeting camera. For example, the GPS may communicate with a satellite-based radionavigation system to measure a first position of the targeting camera at a first time and a second position of the targeting camera at a second time. The pose and motion correction system may comprise an Internal Navigation System (INS). The INS may be directly or indirectly coupled to the targeting camera. For example, the INS may comprise motion sensors, for example accelerometers, and rotation sensors, for example gyroscopes, to measure the position, the orientation, and the velocity of the targeting camera. The pose and potion correction system may or may not use external references to determine a change in position of the targeting camera. The pose and motion correction system may determine a change in position of the targeting camera from the first position and the second position. In some embodiments, after the target prediction system locates a target in an image, the pose and motion correction system determines an amount of time that has elapsed since the image was captured and the magnitude and direction of motion of the prediction camera that has occurred during the elapsed time. The pose and motion correction system may integrate the target location, time elapsed, and magnitude and direction of motion to determine a corrected location of the target on the surface.

The prediction module may further comprise an image detection module. The imaging detection module may be configured to locate and identify a target in an image. For example, the imaging detection module may be configured to differentiate between two plants, such as between a crop and a weed. In some embodiments, the imaging detection module comprises using a convolutional neural net. The neural net may be trained with many images, such as images from the prediction camera or the targeting camera, of surfaces with or without targets. For example, the neural net may be trained with images of fields with or without weeds. Once trained, the neural net may be configured to identify a region in the image comprising a target. The region may be defined by a polygon, for example a rectangle. In some embodiments, the region is a bounding box. In some embodiments, the region is a polygon mask covering an identified region.

Based on the location of the target, a target assignment system 814 may assign the target to a targeting module 820 of a plurality of targeting modules. The location of the target may be corrected based on a magnitude and direction of motion during an elapsed time, or the location may be within a region defined by a polygon, or both. A future target location may be determined based on a predicted magnitude and direction of motion during future time period. The target assignment module may assign the target to the targeting module having a coverage area that overlaps with the target location, the corrected target location, or the future target location.

The prediction module may comprise a system controller, for example a system computer having storage, random access memory (RAM), a central processing unit (CPU), and a graphics processing unit (GPU). The system computer may comprise a tensor processing unit (TPU). The system computer should comprise sufficient RAM, storage space, CPU power, and GPU power to perform operations to detect and identify a target. The prediction camera should provide images of sufficient resolution on which to perform operations to detect and identify a target.

Targeting Modules

Disclosed herein are targeting modules configured to direct a beam toward a target location on a surface. FIG. 8 illustrates a targeting module 820 configured to predict the location of a target and move one or more optical elements to direct the beam toward the target location. A plurality of targeting modules may be in communication with the prediction module 810. The targeting module comprises an optical control system as described herein. For example, as shown in FIG. 1-3, the targeting module may comprise an emitter 101 that emits a beam 102 along an optical path, and a beam combining element 103, optionally a targeting camera 104, a first reflective element 105 configured to deflect the beam controlled by a first actuator, and optionally, a second reflective element 106 configured to deflect the beam controlled by a second actuator, positioned in the optical path. One or both of the actuators may be configured to rotate the one or both of reflective elements about a first axis of rotation, and optionally a second axis of rotation, thereby changing the deflection of the beam path and translating a position at which the beam encounters a surface along a first translational axis, and optionally, along a second translational axis. In some embodiments, the first actuator and the second actuator may rotate a single reflective element about a first axis of rotation and a second axis of rotation, providing translation of the position of the point at which the beam encounters the surface along a first translational axis and a second translational axis. The prediction camera should have a sufficiently large field of view to image the coverage area of the beam path.

As shown in FIG. 8, the target prediction system 821 captures an image of an area on a surface. The area may be predicted to contain a target, as predicted by the prediction module 810. The target prediction system may identify a pixel location of the target in the image. The camera to control translation system 822 may convert the pixel location of the target image into a position of the first reflective element, and optionally, a position of the second reflective element. The positions of the reflective elements may be controlled by actuators, as described herein. For example, the camera to control translation system may convert the pixel location of the target into pan or tilt values of one or both actuators corresponding to mirror positions predicted to deflect the beam to the target location.

In some embodiments, the target prediction system further comprises an image detection module. The imaging detection module may be configured to locate and identify a target in an image. For example, the imaging detection module may be configured to differentiate between two plants, such as between a crop and a weed. In some embodiments, the imaging detection module comprises using a convolutional neural net. The neural net may be trained with many images, such as images from the prediction camera or the targeting camera, of surfaces with or without targets. For example, the neural net may be trained with images of fields with or without weeds. Once trained, the neural net may be configured to identify a region in the image comprising a target. The region may be defined by a polygon, for example a rectangle. In some embodiments, the region is a bounding box. In some embodiments, the region is a polygon mask covering an identified region.

The target location may be further corrected using the pose and motion correction system 823. The pose and motion correction system may use a positioning system, for example an IMU, a GPS, or an INS, to determine a magnitude and direction of motion of the targeting camera. In some embodiments, acceleration and rotation readings from an IMU coupled directly or indirectly to the targeting camera are used to determine a magnitude and direction of motion. For example, the prediction camera and the IMU may be mounted to a vehicle. The IMU may collect motion readings of the IMU, and anything directly or indirectly coupled to the IMU, such as the targeting camera. For example, the IMU may collect readings comprising three-dimensional acceleration and three-dimensional rotation information which may be used to determine a magnitude and a direction of motion over an elapsed time. In some embodiments, the pose and motion correction system may use GPS to determine a magnitude and direction of motion of the targeting camera. For example, the GPS may be mounted to the vehicle. The GPS may communicate with a satellite-based radionavigation system to measure a first position of the targeting camera at a first time and a second position of the targeting camera at a second time. In some embodiments, the pose and motion correction system may use an INS to determine a magnitude and direction of motion of the targeting camera. For example, the INS may measure the position, the orientation, and the velocity of the targeting camera. In some embodiments, after the target prediction system 821 locates a target in an image, the pose and motion correction system determines an amount of time that has elapsed since the image was captured and the magnitude and direction of motion of the targeting camera that has occurred during the elapsed time. The pose and motion correction system may integrate the target location, time elapsed, and magnitude and direction of motion to determine a corrected location of the target on the surface. In some embodiments, the positioning system used by the pose and motion correction system of the targeting module 823 and the positioning system used by the pose and motion correction system of the prediction module 813 are the same. A future target location may be determined based on a predicted magnitude and direction of motion during future time period. In some embodiments, the positioning system used by the pose and motion correction system of the targeting module and the positioning system used by the pose and motion correction system of the prediction module are different.

The actuator control system 824 comprises software-driven electrical components capable of providing signals the first actuator, and optionally the second actuator, controlling the first reflective element, and optionally the second reflective element. For example, the actuator control system sends a signal comprising actuator pan tilt values to the first actuator and the second actuator. The actuators adopt the signaled pan tilt positions and move the first reflective element and the second reflective element around a first rotational axis and a second rotational axis to positions such that the beam is deflected to the target location, the corrected target location, or the future target location.

The laser control system 825 comprises software-driven electrical components capable of controlling activation and deactivation of the emitter. Activation or deactivation may depend on the presence or absence of a target as detected by the targeting camera 104. Activation or deactivation may depend on the position of the beam path directed toward the surface relative to a target location. In some embodiments, the laser control system may activate the emitter when a target is identified by the target prediction system. In some embodiments, the laser control system may activate the emitter when the beam path is positioned to overlap with the target location. In some embodiments, the laser control system may fire the emitter when the beam path is within a region of the surface comprising a target defined by a polygon, for example a bounding box or a polygon mask covering the identified region. The laser control system may deactivate the emitter once the target has been eliminated, the region comprising the target has been scanned by the beam, the target is no longer identified by the target prediction module, a designated period of time has elapsed, or any combination thereof. For example, the laser control system may deactivate the emitter once a region on the surface comprising a weed has been scanned by the beam, or once the weed has been irradiated or burned.

The prediction modules and the targeting modules described herein may be used in combination to locate, identify, and target a target with a beam. The targeting control module may comprise an optical control system as described herein. The prediction module and the targeting module may be in communication, for example electrical or digital communication. In some embodiments, the prediction module and the targeting module are directly or indirectly coupled. For example, the prediction module and the targeting module may be coupled to a support structure. In some embodiments, the prediction module and the targeting module are configured on a vehicle, for example the vehicle 601, as shown in FIG. 6 and FIG. 7.

The targeting module may comprise a system controller, for example a system computer having storage, random access memory (RAM), a central processing unit (CPU), and a graphics processing unit (GPU). The system computer may comprise an tensor processing unit (TPU). The system computer should comprise sufficient RAM, storage space, CPU power, and GPU power to perform operations to detect and identify a target. The targeting camera should provide images of sufficient resolution on which to perform operations to detect and identify a target.

Calibration Methods

The prediction modules disclosed herein may further comprise calibration step. In some embodiments, the camera to control translation system of the prediction module 812 is calibrated. In some embodiments, a calibration surface is positioned within a field of view of a prediction camera. The calibration surface comprises known marks at known positions. The prediction camera may collect a plurality of images of the calibration surface at different positions relative to the calibration surface. The prediction module may then correlate a pixel position of a known mark to the known position on the surface. An interpolation function may be built from a plurality of correlated pixel positions and known surface positions. In some embodiments, the interpolation function may be saved to a hard drive and loaded from the hard drive by the prediction module.

The targeting modules disclosed herein may further comprise calibration step. In some embodiments, the camera to control translation system of the targeting module 812 is calibrated. In some embodiments, a calibration surface is positioned within a field of view of a targeting camera. The calibration surface comprises known marks at known positions. The targeting module may collect a plurality of images of the calibration surface and a plurality of actuator positions, such that the plurality of images comprises different fields of view. For example, the targeting module may collect a plurality of images at a plurality of randomly selected pan tilt values of a first actuator and a second actuator. A calibration map may be built from a plurality of sample points. Each sample point may be collected by identifying a pixel location of a known mark in an image collected at a known actuator position, and correlating the known location with the actuator position and the pixel location. In some embodiments, the map is fitted to a spline smoothing algorithm to build smooth curves to allow for accurate estimation of locations between the sample points. In some embodiments, the spline smoothing algorithm may be saved to a hard drive and loaded from the hard drive by the targeting module.

Weed Eradication System

Figure 9:
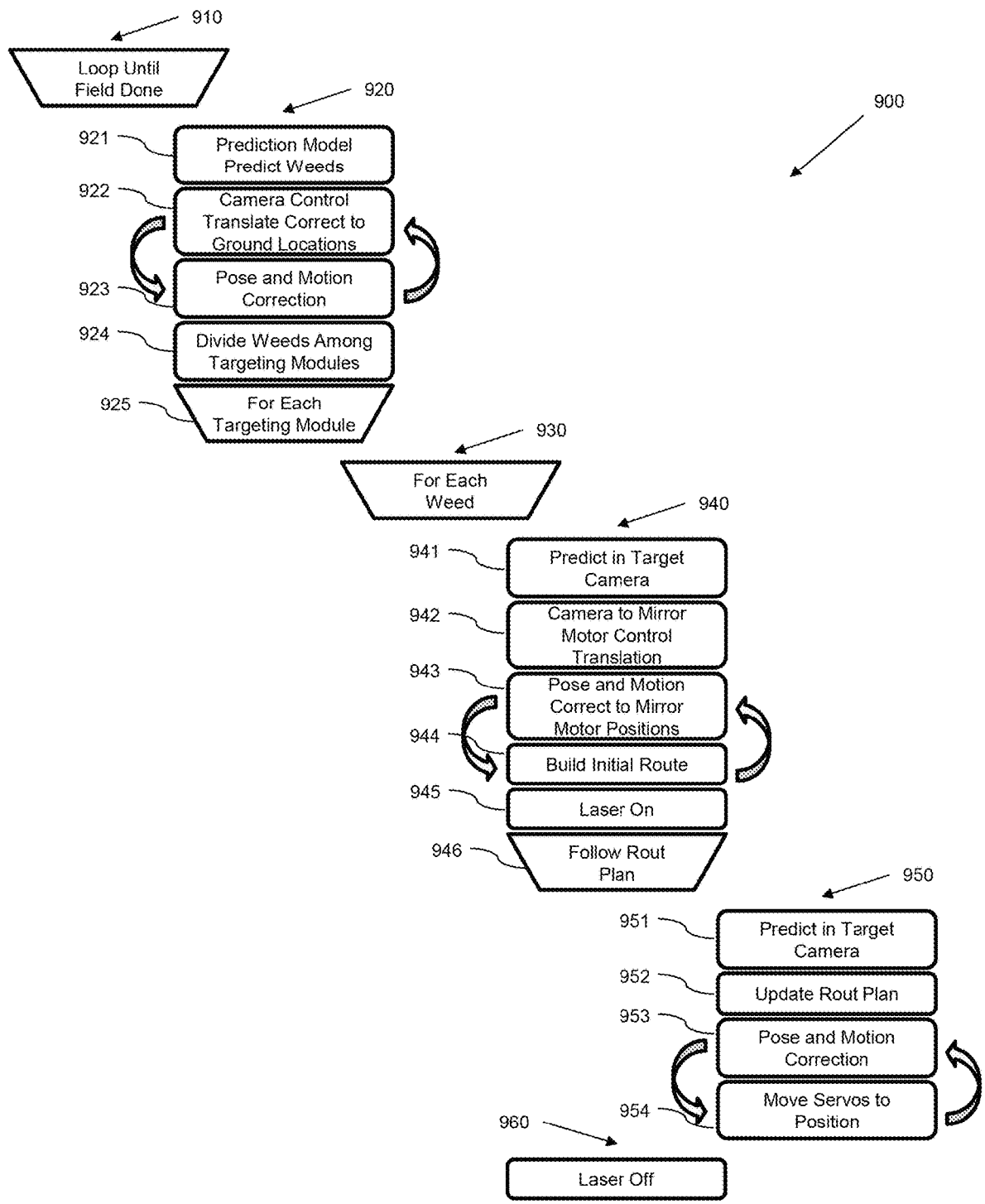
FIG. 9 depicts a method of identifying, assigning, targeting, and eradicating weeds in a field, in accordance with one or more embodiments herein.

FIG. 9 illustrates a process 900 for an embodiment of the devices and methods disclosed herein. The following example is illustrative and non-limiting to the scope of the devices, systems, and methods described herein. The process comprises identifying, assigning, targeting, and eradicating weeds in a field. In this example, a weed eradication system comprises a prediction module 810 in communication with a plurality of targeting modules 820. The prediction module and the targeting module are controlled by a system controller, for example a computer comprising storage, RAM, CPU, and GPU. Each targeting module comprises an optical control system 100, as shown in FIG. 1-3. The prediction module and the targeting modules are coupled to a solid support. The solid support is positioned on a vehicle 601, as shown in FIG. 6 and FIG. 7.

As shown in FIG. 9, operations 920, 930, 940, 950, and 960 are iterated until a field of interest has been completely scanned 910. First, the prediction module runs operation 920. The prediction camera collects an image of a field surface in an area surrounding or in front of the vehicle. The system controller processes the image and identifies weeds in the image. At step 921, the prediction model predicts the location of one or more weeds identified in the image. The camera to control system translates a pixel coordinate of a weed in the image to a ground location at step 922. The system controller instructs the vehicle to adjust position and velocity 923 based on motion of the vehicle measured by an IMU at 922. Each one of the one or more weeds is assigned to a targeting module 924 based on the ground location of the weed and a coverage area of the targeting module.

Operations 930, 940, 950, and 960 are iterated for each target module 925. Operations 940, 950, and 960 are iterated for each weed. A targeting module of the plurality of targeting modules runs operation 940. The targeting camera captures a target image of the field, and the system controller identifies the weed in the target image 941. The system controller translates a pixel location of the weed in the target image into pan and tilt values for each actuator controlling each reflective element in an optical control system controlled by targeting module 942. The system controller applies a pose and motion correction to the actuator pan and tilt values based on motion of the vehicle measured by the IMU at 943 and plans a route for an emitted beam path controlled by the actuator pan and tilt positions 944. Once the actuators reach a determined position, an emitter is activated 945.

Operation 950 is repeated while the planned route is implemented 946. The weed is identified in an image collected by the targeting camera, and the route plan is updated based on an observed position of the weed 952. The system controller applies a pose and motion correction to the actuator pan and tilt values based on motion of the vehicle measured by the IMU at 953. The actuators are moved into position based on the updated route plan 954. Once the planned route has been completed the emitter is deactivated 960.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A system for damaging or killing weeds, the system comprising:
    a camera configured to capture images of plants in a field;
    a light source configured to emit a light beam with a wavelength within a range from 300 nm to 100 µm;
    a control system comprising:
        a first actuator and a first mirror for directing a path of the light beam,
        a second actuator and a second mirror for directing the path of the light beam,
        wherein the control system is configured to direct the path of the light beam towards a target using the first and second mirrors;
    a housing configured to at least partially enclose the light source and the control system;
    a computing system; and
    a frame configured to move over the field, wherein the camera, the housing, the light source, the control system, and the computing system are supported, directly or indirectly, by the frame,
    wherein the computing system is configured to perform operations comprising:

receiving an image of at least one plant in the field captured by the camera at a first time, detecting a weed in the image of the at least one plant, wherein the detecting is performed using a neural network configured to differentiate between a weed and a crop, predicting a target location of the weed in the field at a second time later than the first time, wherein the predicted target location accounts for motion of the camera relative to the weed during an elapsed time between the first time and the second time, causing one or both of the first or second actuators to control one or both of the first or second mirrors to direct the path of the light beam toward the predicted target location of the weed in the field, causing the light source to emit the light beam along the path towards the predicted target location of the weed, and causing the light source to continue emitting the light beam for a length of time sufficient to damage or kill the weed.

2. The system of claim 1, wherein the operations further comprise keeping the light beam directed toward the predicted target location for the length of time sufficient to damage or kill the weed.

3. The system of claim 2, wherein the operations further comprise causing the light source to be deactivated after the length of time sufficient to damage or kill the weed.

4. The system of claim 1, wherein the light beam has a power within a range from 10 W to 10 kW.

5. The system of claim 1, wherein the wavelength of the light beam is within a range from 300 nm to 500 nm.

6. The system of claim 1, wherein the first and second mirrors are configured to direct the light beam to target locations in a coverage area.

7. The system of claim 6, wherein the operations further comprise translating the predicted target location of the weed into pan or tilt values for one or both of the first or second actuators, the pan or tilt values corresponding to positions of one or both of the first or second mirrors that are configured to deflect the light beam to the predicted target location.

8. The system of claim 1, wherein the neural network comprises a convolutional neural network that is trained on images of weeds and crops.

9. The system of claim 8, wherein the convolutional neural network is trained to identify a region in the image of the at least one plant that contains the weed.

10. The system of claim 9, wherein the predicting of the target location of the weed is based at least in part on a pixel position of the weed in the image of the at least one plant.

11. The system of claim 1, wherein the operations further comprise tracking the motion of the camera relative to the weed.

12. The system of claim 11, wherein the motion is tracked using one or more of the following: an inertial measurement unit (IMU), a global positioning system (GPS), or an internal navigation system (INS).

13. The system of claim 1, wherein the frame is configured to be towed or pushed by a vehicle over the field.

14. The system of claim 1, wherein the frame is configured to be moved autonomously or by a human driver.

15. The system of claim 13, wherein the frame comprises a first wheel and a second wheel, and a distance between the first wheel and the second wheel is configured to allow the vehicle to pass over one or more rows of crops in the field.

16. The system of claim 1, wherein the housing fully encloses the light source and the control system.

17. The system of claim 1, wherein the housing has an escape portion configured for the light beam to pass through.

18. The system of claim 17, wherein the escape portion is self-cleaning.

19. A system for damaging or killing weeds, the system comprising:

a camera configured to capture images of plants in a field;

a light source configured to emit a light beam with a wavelength within a range from 300 nm to 100 μm;

a control system comprising:

a first actuator and a first mirror for directing a path of the light beam, a second actuator and a second mirror for directing the path of the light beam, wherein the control system is configured to direct the path of the light beam towards a target using the first and second mirrors, and wherein the first and second mirrors are configured to direct the light beam to a plurality of target locations over a coverage area;

a housing configured to at least partially enclose the light source and the control system;

a computing system; and a frame configured to move over the field, wherein the camera, the housing, the light source, the control system, and the computing system are supported, directly or indirectly, by the frame, wherein the computing system is configured to perform operations comprising:

receiving an image of at least one plant in the field captured by the camera at a first time, detecting a weed in the image of the at least one plant, wherein the detecting is performed using a neural network configured to differentiate between a weed and a crop, tracking motion of the camera relative to the weed, predicting a target location of the weed in the field at a second time later than the first time, wherein the predicted target location accounts for the motion of the camera relative to the weed during an elapsed time between the first time and the second time, and wherein the predicted target location is based at least in part on a pixel position of the weed in the image of the at least one plant, translating the predicted target location of the weed into pan or tilt values for one or both of the first or second actuators, the pan or tilt values corresponding to positions of one or both of the first or second mirrors that are configured to deflect the light beam to the predicted target location, causing one or both of the first or second actuators to control one or both of the first or second mirrors to direct the path of the light beam toward the predicted target location of the weed in the field based at least in part on the pan or tilt values, causing the light source to emit the light beam along the path towards the predicted target location of the weed, causing the light source to continue emitting the light beam for a length of time sufficient to damage or kill the weed, and causing the light source to be deactivated after the length of time sufficient to damage or kill the weed.

20. A system for damaging or killing weeds, the system comprising:

a camera configured to capture images of a portion of a field containing at least one plant;

at least one optical control system comprising:
- a beam emitter configured to output a light beam with a wavelength within a range from 300 nm to 100 µm;
- a first actuator coupled to a first mirror,
- a second actuator coupled to a second mirror,
- wherein the first actuator is configured to control the first mirror to deflect the light beam in a first direction towards the second mirror, and wherein the second actuator is configured to control the second mirror to deflect the light beam in a second direction towards a target, and
- an enclosure configured to at least partially surround the beam emitter, the first actuator, the first mirror, the second actuator, and the second mirror;

a system controller; and a support configured to move over the field, wherein the camera, the at least one optical control system, and the system controller are coupled, directly or indirectly, to the support, wherein the system controller is configured to perform operations comprising:
- receiving an image of in the portion of the field containing the at least one plant, wherein the image is captured by the camera at a first time,
- processing the image to identify a target weed in the image of the portion of the field, wherein the processing comprises providing the image to a neural network that is trained to differentiate between a weed and a crop,
- using an output of the neural network to estimate a location of the target weed in the portion of the field at a second time later than the first time, wherein the estimated location accounts for motion of the camera relative to the target weed during a time period between the first time and the second time,
- activating the beam emitter of the at least one optical system to output the light beam over a length of time sufficient to damage or kill the weed, and
- causing one or both of the first or second actuators of the at least one optical system to control one or both of the first or second mirrors to deflect the light beam towards the estimated location of the target weed.

21. The system of claim 20, wherein the operations further comprise keeping the light beam deflected towards the estimated location of the target weed for at least the length of time sufficient to damage or kill the target weed.

22. The system of claim 21, wherein the operations further comprise deactivating the beam emitter after at least the length of time sufficient to damage or kill the target weed.

23. The system of claim 20, wherein the wavelength of the light beam is within a range from 300 nm to 500 nm.

24. The system of claim 20, wherein the neural network comprises a convolutional neural network that is trained on images of fields with weeds and crops.

25. The system of claim 24, wherein the convolutional neural network is trained to identify a region in the image of the portion of the field that contains the target weed.

26. The system of claim 25, wherein the output of the neural network comprises one or more positions corresponding to the region in the image of the portion of the field that contains the target weed.

27. The system of claim 20, wherein the operations further comprise converting the estimated location of the weed into one or more actuator positions for the one or both of the first or second actuators, the one or more actuator positions configured to cause the one or both of the first or second mirrors to deflect the light beam towards the estimated location of the target weed.

28. The system of claim 20, wherein the operations further comprise tracking one or more of a magnitude or a direction of the motion of the camera relative to the target weed.

29. The system of claim 28, wherein the tracking is performed using one or more of the following: an inertial measurement unit (IMU), a global positioning system (GPS), or an internal navigation system (INS).

30. The system of claim 20, wherein the support is configured to be coupled to a first vehicle that is configured to be towed or pushed by a second vehicle over the field.

* * * * *